United States Patent [19]
Matsuda

[11] 3,977,011
[45] Aug. 24, 1976

[54] LIGHT MEASURING APPARATUS

[75] Inventor: Motonobu Matsuda, Izumi, Japan

[73] Assignee: Minolta Camera Kabushiki Kaisha, Japan

[22] Filed: Mar. 6, 1975

[21] Appl. No.: 555,735

[30] Foreign Application Priority Data
Mar. 8, 1974  Japan ............................... 49-27383

[52] U.S. Cl. .................................. 354/24; 354/50; 354/51; 354/60 R; 356/223
[51] Int. Cl.² ........................................ G03B 7/08
[58] Field of Search ............... 354/24, 50, 51, 60 R; 250/214 P; 356/223

[56] References Cited
UNITED STATES PATENTS

| | | | |
|---|---|---|---|
| 3,430,053 | 2/1969 | Westhaver | 250/214 P |
| 3,441,835 | 4/1969 | Hekrdle | 356/223 |
| 3,620,143 | 11/1971 | Burgarella | 250/214 P |
| 3,690,230 | 9/1972 | Mori et al. | 354/24 |

*Primary Examiner*—Russell E. Adams, Jr.
*Attorney, Agent, or Firm*—Craig & Antonelli

[57] ABSTRACT

An automatic exposure control system for regulating one or more variable photographic parameters. The light level of a scene is evaluated using a photosensitive voltage source. A differential amplifier with a non-linear negative feedback is provided to allow one or more inexpensive linear potentiometers to be used to enter the aperture value and film sensitivity information into the system. Based on these parameters, the system automatically controls the camera shutter speed.

14 Claims, 12 Drawing Figures

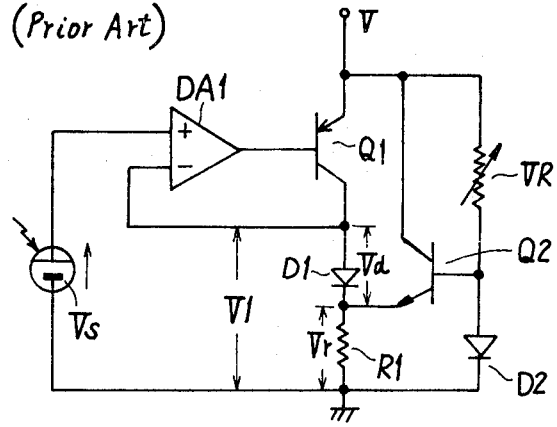
FIG.1. (Prior Art)
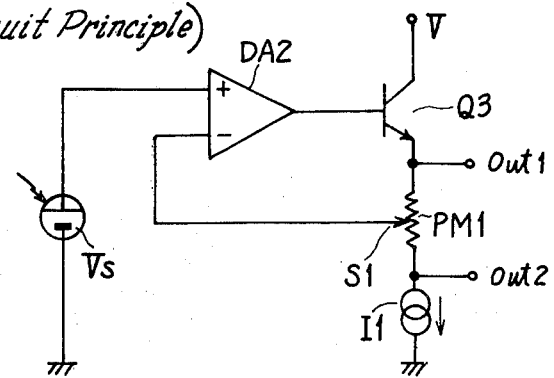
FIG.2. (Circuit Principle)
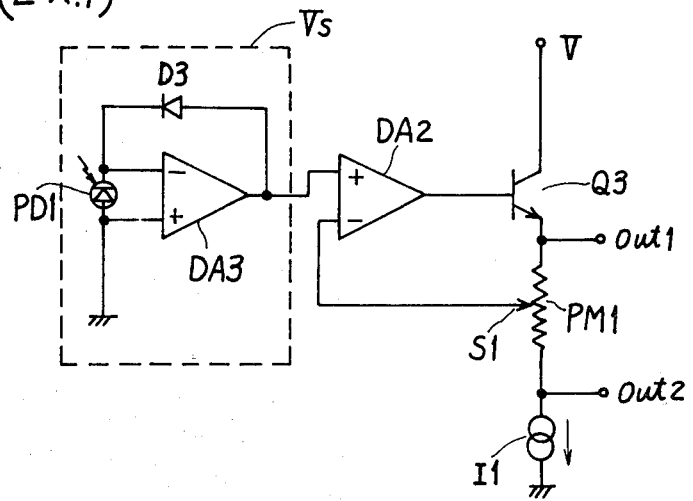
FIG.3. (Ex.1)

FIG.4.(Ex.2)
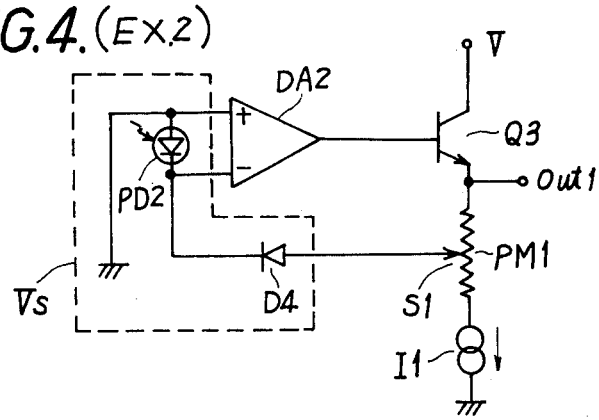
FIG.5.(Ex.3)
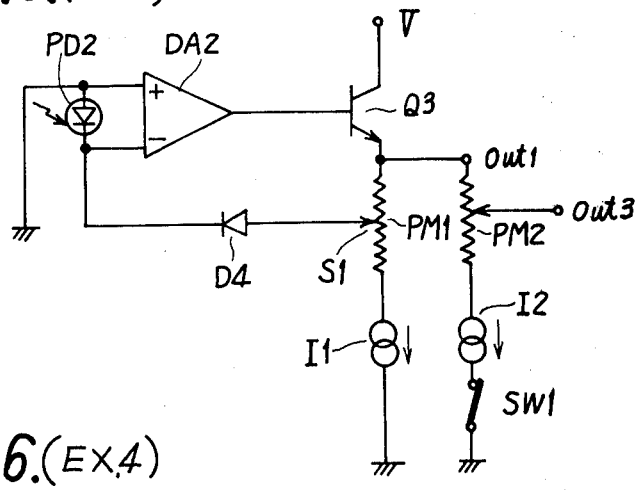
FIG.6.(Ex.4)
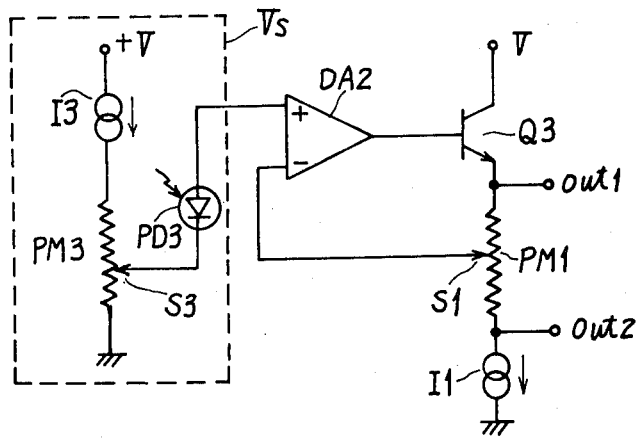

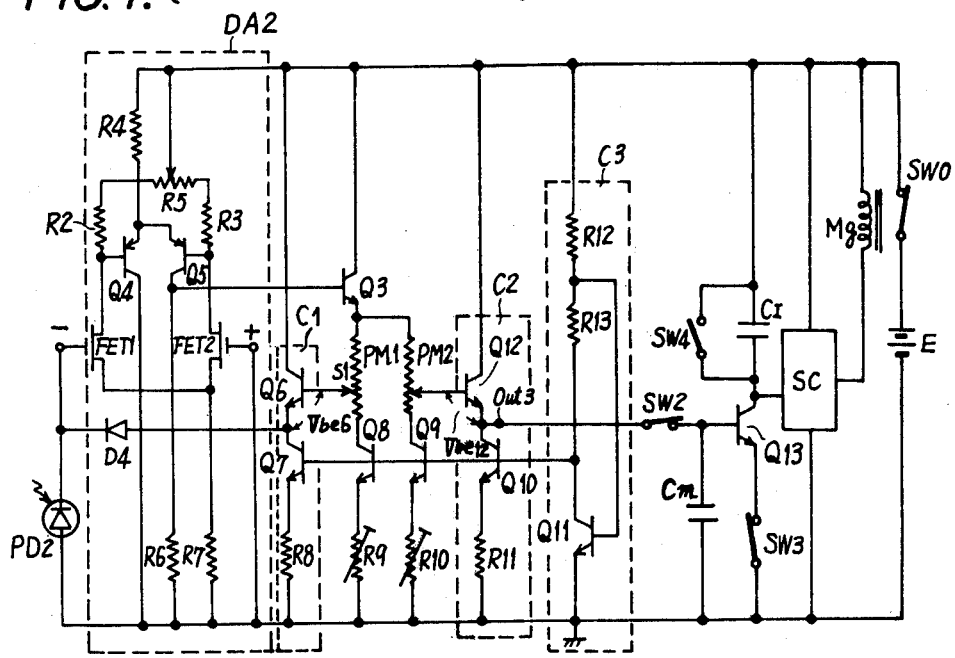
FIG. 7. (detailed example of Fig. 4)
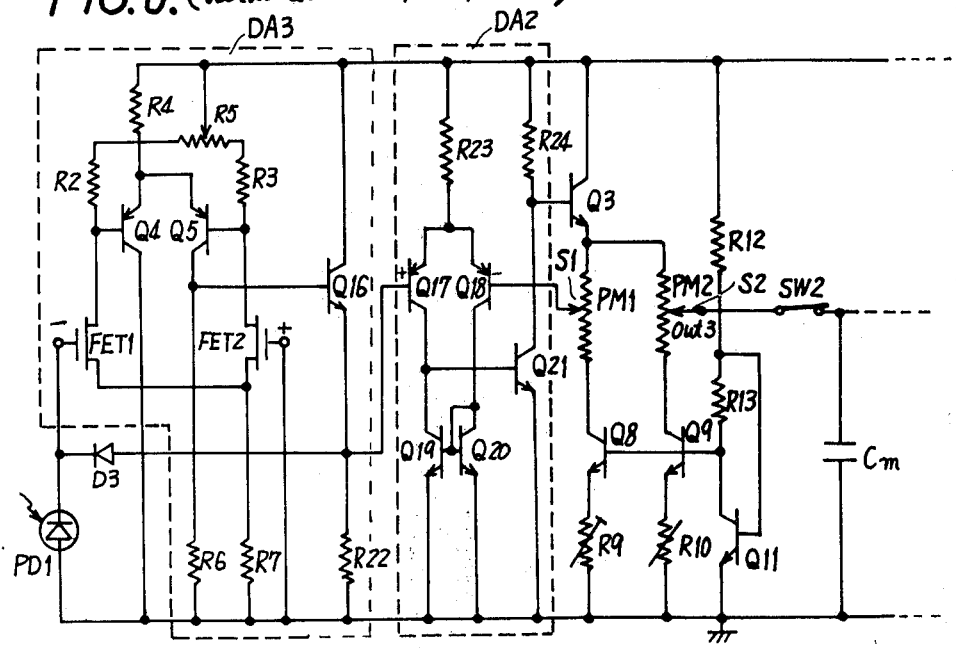
FIG. 8. (detailed example of Fig. 3)

(detailed example modified from Fig. 2 & Fig. 6)

LIGHT MEASURING APPARATUS

BACKGROUND OF THE INVENTION

This invention relates to a light measuring apparatus to be used in an automatic exposure-control apparatus or for an exposure-meter in cameras which computes exposure information from inputs such as photographic objective brightness, film sensitivity, aperture value, etc.

In the conventional automatic exposure-control circuit for a single-lens reflex camera employing a TTL (through-the-lens) light measuring system, since the objective brightness ranges over a considerably wide area, a voltage to be stored in a storage capacitor as an electric signal representing the measured brightness varies in proportion to the logarithm of brightness; the so-called logarithm-compression process is employed.

The exposure time is determined by information representative of objective brightness, as well as by information representative of film sensitivity and aperture value. In this process the film sensitivity and the aperture value vary exponentially, such as twofold, fourfold, eightfold, and so on. In order to apply such quantities, together with the information of logarithmically compressed objective brightness to the control circuit, the information representative of film sensitivity and aperture value is also converted into logarithmic quantities. This type of computation is carried out in an APEX system.

The conventionally employed circuit for controlling the exposure time in accordance with information representative of logarithmically compressed objective brightness, film sensitivity and aperture value has been constituted as shown in FIG. 1, wherein $Vs$ indicates a voltage source, for instance, a photodiode or solar battery, to produce a voltage $Vs$ proportional to the objective brightness. A luminance value $Bv$ which responds to an objective brightness in the APEX system is represented by the output voltage $Vs$ of this voltage source $Vs$. DA1 indicates a differential amplifier, and to its non-inversion input terminal "+" said information of objective brightness is imparted. Q1 is a transistor for imparting a negative inversion to the differential amplifier DA1, and the collector of the transistor is connected to an inversion input terminal "−" of the differential amplifier DA1.

VR indicates a variable resistor for setting a resistance value in accordance with the film sensitivity and the aperture value, and its resistance value is changed exponentially for each change of one step in the film sensitivity or the aperture value. This variable resistor VR and a diode D2 are connected in series between a power source terminal V and ground (the power source between terminal V and ground being omitted in the drawing). A transmission Q2 and a resistor R1 constitute an emitter-follower circuit, which produces a voltage appearing at the diode D2 at the emitter of transistor Q2. D1 indicates a diode connected across the collector of the transistor Q1 and the emitter of the transistor Q2.

The following is an explanation of the function of prior-art circuit shown in FIG. 1. The differential amplifier DA1 receives a negative feedback from the collector of the transistor Q1. As a result, the voltage V1 between the collector of the transistor Q1 and ground becomes equal to the voltage Vs which is proportional to the information Bv of the objective brightness. If the resistance value of the variable resistor VR is set in accordance with the film sensitivity and the aperture value, a current corresponding to this resistance value flows into the diode D2. Across the diode D2, a voltage proportional to the logarithm of this current appears, and this voltage is impressed as an input signal to the emitter-follower circuit which is constituted by the transistor Q2 and the resistor R1.

The variable resistor VR is designed to have a characteristic such that its resistance value varies exponentially, and the voltage appearing across the diode D2 is proportional to the logarithm of the current flowing therein. Therefore, the input voltage of the emitter-follower circuit varies linearly relative to each step of variation in the film sensitivity and the aperture value, and each step corresponds to each variation of an equiangular rotation of the variable resistor VR.

Due to the above-mentioned functions, a voltage $Vr$ which varies linearly for each stepwise difference of the film sensitivity or the aperture value appears across the resistor R1, and thus, the logarithmically compressed information of film sensitivity or aperture value appears in the form of voltage $Vr$ across the resistor R1. This logarithmically compressed information of film sensitivity and aperture value represent APEX indices $Sv$ and $Av$, respectively. On the other hand, between the collector of the transistor Q1 and ground there is, as mentioned above, the voltage V1 which is equal to the voltage $Vs$ that is proportional to the luminance value $Bv$. Therefore, across the diode D1 there appears a voltage $Vd$ which is the difference between the voltage V1 and voltage Vr, expressed by the equation $Vd=V1-Vr$.

In the above equation, the voltage V1 is proportional to the luminance value $Bv$ and the voltage $Vr$ is proportional to the difference between the aperture value $Av$ and the film sensitivity value $Sv$. Therefore, the relation of $Vd \alpha Bv-(Av-Sv)$ holds, and by the known equation $Tv=Bv-(Av-Sv)$ for providing an exposure-time value $Tv$, the voltage $Vd$ provides the exposure-time value $Tv$. By this value $Tv$, the exposure time is controlled, but actually, a logarithmic expansion of the voltage $Vd$ for providing the exposure-time value is used. In other words, a current proportional to an inverse logarithm of the voltage $Vd$ flows in the diode D1, and this current is fed to an integrating capacitor to convert it into voltage. The exposure time is controlled by the voltage across this capacitor.

Thus, in the above-mentioned circuit of FIG. 1 showing the prior art, a variable resistor for exponentially changing the resistance value is necessary. Moreover, for the purpose of producing a voltage precisely proportional to the wide-range information $Sv$ and $Av$ of the film sensitivity and the aperture value, respectively, across the resistor R1, the voltage to be impressed on the base of the transistor Q2 must be comparatively high in view of the characteristic of the emitter-follower circuit. For filling these requisites, such expedients as increasing the number of diodes corresponding to diode D2, increasing the power-source voltage, etc. have been employed at an expense of a greater power consumption for the circuit and other disadvantages.

SUMMARY OF THE INVENTION

This invention provides a computing apparatus free from the above-mentioned shortcomings.

The apparatus of the present invention enables the use of a linearly changing ordinary variable resistor instead of a hitherto used exponentially changing one, and is capable of responding to a much wider range of film sensitivity, and can operate with a power-source of limited voltage.

BRIEF EXPLANATION OF THE DRAWINGS

FIG. 1 is a circuit diagram showing an example of the prior art,

FIG. 2 is a circuit principle diagram for explaining the present invention,

FIGS. 3 to 6 are circuit diagrams showing various circuits modified from the circuit of FIG. 2, and FIGS. 7 to 10 are circuit diagrams of more detailed embodiments of this invention.

DETAILED DESCRIPTION OF THE INVENTION

Figure 9:
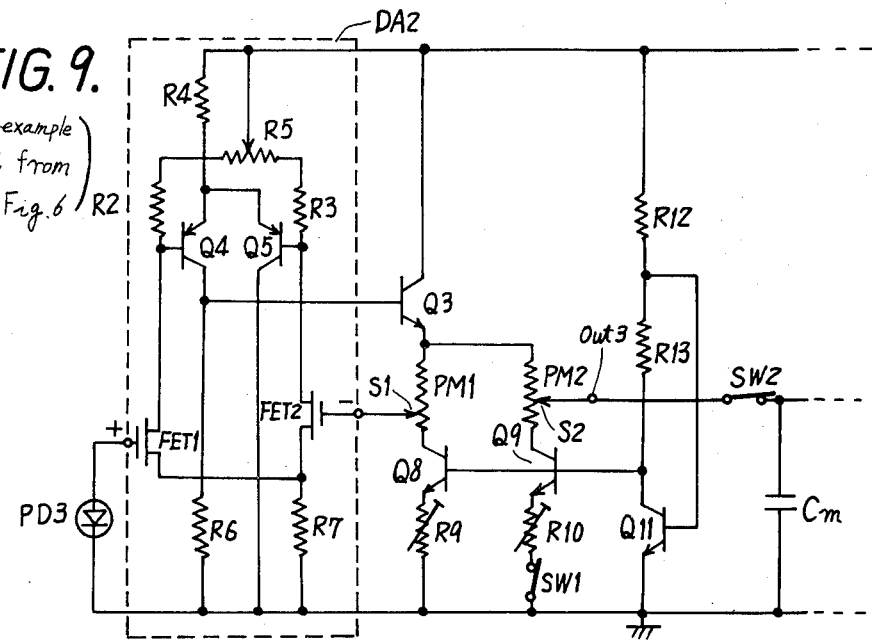

FIG. 2 is a circuit diagram to show the principle of this invention, wherein $Vs$ indicates an electric power-source, the same as $Vs$ shown in FIG. 1, to produce a voltage proportional to information $Bv$ representative of the objective brightness. DA2 indicates a differential amplifier, whose non-inversion input terminal "+" is connected to the power-source $Vs$ and the inversion input terminal "−" of which is connected to a sliding terminal S1 of a potentiometer PM1 connected to an emitter of a transistor Q3. The potentiometer PM1 is an ordinary potentiometer capable of linearly varying its resistance value relative to movement of its sliding contact. This potentiometer PM1 sets the information of the film sensitivity value $Sv$ and the aperture value $Av$, respectively. The transistor Q3 and the potentiometer PM1 constitute an emitter-follower circuit which effects negative feedback for the differential amplifier DA2. An electric current source I1 connected between the potentiometer PM1 and ground is a temperature dependent constant current source which produces a constant current proportional to absolute temperature such as, for instance, described in the specification of the U.S. Pat. No. 3,831,040 granted to the the assignee of the present application, Minolta Camera Kabushiki Kaisha. At both ends of the potentiometer PM1 are provided output terminals Out 1 & Out 2. V indicates a terminal connected to a positive end of an electric power-source (not shown in the drawing) for driving the transistor Q3.

Next, the operation of the above-mentioned circuit will be explained. The power-source $Vs$ produces a voltage proportional to the value $Bv$ of the objective luminance. The position of the sliding terminal S1 is determined in accordance with the sensitivity of the film used and the aperture value. Between the output terminal Out 1 and the sliding terminal S1 there appears a voltage proportional to the difference between the film sensitivity information $Sv$ and the aperture value $Av$, namely, a voltage proportional to $Sv-Av$. The differential amplifier DA2 receives a feedback signal, and consequently, a voltage proportional to the value $Bv$ of the objective luminance is produced between the sliding terminal S1 and ground. Therefore, the voltage between the terminal Out 1 and ground becomes proportional to the total of the potential of the sliding terminal S1 plus a voltage across the terminal Out 1 and the terminal S1, namely, equal to a voltage proportional to $Bv+Sv-Av$. From the afore-mentioned known equation $TV=Bv-(Av-Sv)$, it can be understood that the immediately abovementioned total voltage provides the exposure-time information $Tv$.

The potential of the output terminal Out 2 is represented by a potential obtained by subtracting a voltage across the terminals Out 1 & Out 2 from the potential of terminal Out 1. The voltage across the terminals Out 1 & Out 2 is constant. Therefore between the terminal Out 2 and ground, there appears a voltage equal to the difference between the potential at the terminal Out 1 minus the constant voltage, and hence, the output appearing at the terminal Out 2 can be also utilized as the exposure-time value $Tv$.

The control of shutter time is effected by the exposure-time information as explained hereinafter. The selection of output for this function, whether the output appearing at the terminal Out 1 is used or that appearing at Out 2 is used, depends on the design of the shutter-time control circuit. FIGS. 7 to 10, to be explained later, are examples of the cases employing the voltage appearing between the terminal Out 1 and ground as the exposure-time value $Tv$.

FIGS. 3–5 show light measuring circuits which produce a voltage $Vs$ which is proportional to the logarithm $Bv$ of the objective brightness.

In the circuit of FIG. 3, a photodiode PD1 is used as a light-detecting element, and both its ends are connected across input terminals of a differential amplifier DA3, to which a negative feedback is imparted through a diode D3. A circuit $Vs$ formed as above constitutes a light measuring circuit. In this circuit $Vs$, the differential amplifier DA3 receives the negative feedback, and therefore the voltage across both input terminals is maintained at about zero volts. The photodiode PD1 receives light from the photo-object and produces a photoelectric current proportional to the light quantity received. This photoelectric current flows through the diode D3 and produces across it a voltage proportional to the logarithm of said photoelectric current. In such manner, a voltage proportional to the objective luminance value $Bv$ is produced at the output of the differential amplifier DA3, and this voltage is fed to the non-inversion input terminal "+" of said amplifier DA2.

FIG. 4 shows another circuit which is simplified relative to that of FIG. 3, due to the omission of the differential amplifier DA3 substituted by common use of DA2. In this circuit, a negative feedback is imparted to the differential amplifier DA2 from the sliding terminal S1 through a diode D4 and no voltage appears across the input terminals of the differential amplifier DA2 which are connected across both ends of the photodiode PD2. The photoelectric current appearing at the photodiode PD2 flows in the diode D4 and produces a voltage proportional to the objective luminance value $Bv$ across the diode D4. In this case, the photoelectric current flows through a part of the potentiometer PM1, but the effect of this photoelectric current on the output can be eliminated by increasing the electric current of the constant current source I1 or by a means to be explained later.

FIG. 5 shows another circuit modified relative to the one shown in FIG. 4, wherein a second potentiometer PM2 and a second constant current source I2 are added to the circuit of FIG. 4. In the circuits of FIGS. 2 to 4, the values $Sv$ and $Av$ of film sensitivity and aperture are totalled into one source of information and are set by the potentiometer PM1. However, in the circuit of FIG. 5, the film sensitivity value and aperture value $Sv$ and $Av$ can be independently set. In this case, the film sensitivity value $Sv$ is determined by the potentiometer PM1 and the aperture value A$v$ is determined by the potentiometer PM2. I1 and I2 indicate the circuits for supplying constant electric currents proportional to absolute temperature, respectively. A switch SW1 is a switch for change-over between a full-aperture measurement and a stop-down measurement, the switch being closed for measuring with the full aperture and being opened for measuring with the aperture stop down. In the case of the stopped-down measurement, the quantity of light received by the photodiode includes the aperture value A$v$, and therefore, further setting of the aperture value A$v$ by the potentiometer, PM2 is not necessary, and hence, the circuit of the potentiometer PM2 is opened and the emitter voltage of the transistor Q3 is derived as an output. When the switch SW1 is opened, the emitter voltage appears at the output terminal Out 3.

FIG. 6 is a circuit diagram showing another circuit constituting the power-source V$s$ of FIG. 2, wherein a photodiode PD3 is connected between a sliding terminal S3 of a potentiometer PM3 and the non-inversion input terminal "+" of the differential amplifier DA2 and produces a voltage proportional to the luminance value B$v$ of the objective luminance. Namely, the open-circuit voltage of the photodiode PD3 is employed as the voltage source V$s$. I3 is the same kind of electric current source as the aforementioned constant current source I1 and is connected in series with the potentiometer PM3 between the power-source terminal V and ground. The setting for the film sensitivity and aperture values S$v$ and A$v$ can be made with this potentiometer PM3. Also, the film sensitivity and the aperture values S$v$ and A$v$, respectively, can be independently set by using both potentiometers PM3 & PM1.

Next, there will be explained further detailed circuits embodying this invention described above. FIG. 7 is a circuit diagram showing a first detailed embodiment of FIG. 4.

In FIG. 7, the elements corresponding to those in the circuit of FIG. 4 are indicated by the same symbols.

The circuit DA2, comprising field-effect transistors FET1 & FET2, transistors Q4 & Q5, and resistors R2 to R7, is a known differential amplifier, wherein the gates of the field-effect transistors FET1 & FET2 constitute an inversion input terminal "−" and a non-inversion input terminal "+", respectively. A circuit C1 comprising transistors Q6 & Q7 and a resistor R8, is provided in order to prevent the photoelectric current flowing in the diode D4 from entering direct from the sliding terminal S1. If the collector current of the transistor Q7 is set at a higher value than that of the photoelectric current and also to maintain this value constant, the base-emitter voltage V$be$6 of the transistor 6 becomes constant irrespective of the size of the photoelectric current. Then, the base current is supplied to the transistor Q6 due to this base-emitter voltage V$be$6, but if the collector current of a transistor Q8 is set at a large value, a computing error caused by this base current can be neglected.

C3 is a circuit comprising resistors R12 & R13 and a transistor Q11, and constitutes the constant current source circuit I1 together with the transistor Q8 and a resistor R9. This circuit C3 also constitutes the constant current source circuit I2 together with a transistor Q9 and a resistor R10. The circuit C2, provided at a symmetrical position to the circuit C1 and constituted with transistors Q12 and Q10 and a resistor R11, functions to offset the base-emitter voltage V$be$6 of the transistor Q6 by a base-emitter voltage V$be$12 of the transistor Q12. As a result, an output voltage of the differential amplifier DA2 appearing on the plus side of the diode D4 is equal to an output appearing at the terminal Out 3. This output voltage is stored in a memory capacitor C$m$ provided between a switch SW2 and ground. The capacitor C$m$ is connected to an input terminal of a logarithmic-expanding transistor Q13. A capacitor C1 connected between the collector of the transistor Q13 and the positive terminal of the power-source is for integrating the logarithmically expanded output. The switch SW2 connected between the output terminal Out 3 and the base of the transistor Q13 is interlocked with the moving mirror of a reflex type camera so as to be opened immediately before the movement of the mirror for preventing the disturbance of the operation of the capacitor C$m$. A switch SW4 connected across the capacitor C1 is for discharging C1 for resetting the circuit before the shutter opens. A switch SW3 is interlocked with the shutter so as to be closed substantially at the same time of the shutter closing so as to start the integration by the capacitor C1. The collector of the transistor Q13 is connected to an input terminal of a switching circuit SC for driving an electromagnet MG. E indicates a power source and SW0 a power-source switch.

Next, there will be explained the function of the circuit of FIG. 7. Now if the gate potential of the field-effect transister FET1 rises higher than the ground, the collector potential of transistor Q5 drops, and correspondingly thereto, the emitter potentials of the transistors Q3 & Q6 also drop, functioning to counteract an increase in the gate potential of the field-effect transistor FET1. Thus, at both input ends of the differential amplifier DA2 receiving negative feedback, no potential difference occurs. Hence, the gate potential of the field-effect transistor FET1 becomes about equal to ground potential. As a result, a photoelectric current appearing in the photo-diode PD2 flows in the diode D4 and produces a voltage proportional to the objective brightness across the diode D4, namely between the emitter of the transistor Q6 and the ground.

When driving a voltage proportional to the logarithm of photoelectric current across the diode D4 as explained in this example, the temperature dependency of the voltage-current characteristic of the diode D4 must be compensated. Basically, the temperature-dependency of the diode D4 is classified into two types. The first is that even when the current flowing in the diode D4 is constant, the voltage appearing across it varies depending on the temperature, and the second is that the resistance of the diode D4 at a certain performance point, namely, the ratio of voltage variation against current variation of the diode D4, depends on the temperature. Compensation for the first type of temperature dependency can be made by utilizing the diode characteristic for temperature dependency of the base-emitter diode of a logarithmic expanding transistor Q13. Compensation for the second type of temperature dependency is made by supplying a current proportional to an absolute temperature from the constant-current source circuits I1 & I2 to the potentiometers PM1 & PM2. This method of compensation is explained in detail in the specification of U.S. Pat. No. 3,777,638 granted to the above referred to assignee, Minolta Camera Kabushiki Kaisha.

As described above, the values S$v$ and A$v$ of film sensitivity and aperture are set by the potentiometers PM1 & PM2, respectively. The voltage appearing at the sliding terminal S1 is higher by voltage $Vbe6$ than the output voltage appearing at the emitter of the transistor Q6, but this voltage $Vbe6$ is offset by the base-emitter voltage $Vbe12$ of the transistor Q12. As a result, the base-emitter voltage $Vbe6$ of the transistor Q6 is cancelled out and the output is fed to the terminal Out 3. This output is stored by the capacitor $Cm$, logarithmically expanded by the transistor Q13, and charges the capacitor C1 to a specified level. In response to the voltage of the capacitor C1, the switching circuit SC is actuated and energizes a magnet $Mg$ to control the exposure time.

FIG. 8 is a circuit diagram of the second detailed embodiment, and is a detailed embodiment of the example shown in FIG. 3.

A circuit comprising the field-effect transistors FET1 & FET2, the transistors Q4 & Q5, and the resistors R2 to R7 is similar to the differential amplifier DA2 of FIG. 7, and together with an additional transistor Q16 and a resistor R22 constitutes the differential amplifier DA3 corresponding to the circuit of FIG. 3. The junction of the emitter of transistor Q16 and the resistor R22 constitutes the output terminal of the differential amplifier DA3. A circuit DA3 comprising PNP transistors Q17 & Q18, NPN transistors Q19 to Q21, and resistors R23 & R24 is a differential amplifier corresponding to the circuit DA2 shown in FIG. 3.

To the collector circuits of the transistors Q17 and Q18 are connected a collector-emitter circuit of a transistor Q19 and a diode-connected transistor Q20, respectively, with the bases of the transistors Q19 & Q20 connected in common. This connection is for preventing the balance point of the differential amplifier DA2 from being varied by the temperature.

In FIG. 3, the film sensitivity value and aperture value $Sv$ and $Av$ are set by the single potentiometer PM1, but in the example of FIG. 8, as in FIG. 7, two potentiometers PM1 & PM2 are provided, whereby the film sensitivity value $Sv$ and aperture value $Av$ can be independently set. Such elements as the transistors Q3, Q8, Q9, Q11, the resistors R9, R10, R12, R13, the capacitor $Cm$, the switches SW1, SW2, etc. marked with the same symbols as used in FIG. 7, perform the same functions, respectively, as those described for the first embodiment. Incidentally, the logarithmic expanding transistor, integrating capacitor and switches, as well as the power-source and the power-source switch, are omitted from the drawing of FIG. 8.

Next, there will be explained the function of the second embodiment shown by FIG. 8. As is explained on the basis of the principal circuit of FIG. 3, the voltage proportional to the luminance value $Bv$ of the objective brightness appears at the output terminal of the differential amplifier DA3, namely, the emitter of the transistor Q16. This signal voltage is fed into the base of PNP transistor Q17 which is the non-inversion input terminal "+" of the differential amplifier DA2. Since this input voltage is of a low level, (0.2V to 0.7V), relative to ordinary objective brightness, the differential amplifier DA2 is constituted using PNP transistors Q17 & Q18 which are capable of operating at a low input level.

If it is assumed that the base potential of the transistor Q17 is raised by the output of the differential amplifier DA3, the collector current of the transistor Q17 would decrease and consequently, the base current supplied to a base of a transistor Q21 would decrease.

As the result, a collector current of the transistor Q21 would also decrease and the base-emitter voltage of the transistor Q3 would rise. In such a manner, the base potential of the transistor Q18 connected to the sliding terminal S1 of the potentiometer PM1 would rise, and hence the respective base potentials of the transistors Q17 & Q18 would become equal. Herein, since the base current of the transistor Q18 could be made negligibly small compared with the current flowing in the potentiometer PM1, computing errors due to the base current of the transistor Q18 would be almost eliminated. Also, the voltage loss due to contact resistance of the sliding terminal S1 can be neglected. Thus, the light measurement output is precisely conveyed to the sliding terminal S1, and the computed output appears at the sliding terminal S2.

Incidentally, the base bias of the transistor Q21 is determined by the collector-emitter voltage of the transistors Q19, and when the transistors Q17 & Q18 are in the balanced state, the base-bias voltage of the transistor Q21 is set to about 0.5V by the selection of the circuit constants. When so set, the transistors Q17 & Q18 will be used in their near saturation range.

FIG. 9 is a circuit diagram of a third detailed embodiment, and is a detailed embodiment of the example modified relative to FIGS. 2 and 6. This embodiment employs the open-circuit voltage of the photodiode PD3 as the value $Bv$ of the objective luminance. This circuit is constituted according to the principle circuit shown in FIG. 6. The circuit DA2 comprising the field-effect transistors FET1 & FET2, the transistors Q4 & Q5, and the resistors R2 to R7, is a differential amplifier similar to the circuits DA2 & DA3 of the circuits shown in FIG. 7 and FIG. 8, respectively. The open-circuit voltage of the photodiode PD3 is applied to the gate of the field-effect transistor FET1, which corresponds to the non-inversion input terminal "+" of the differential amplifier DA2 and DA3 shown in FIG. 7 and FIG. 8, respectively. The inversion terminal "−" is directly connected to the sliding terminal S1 of the potentiometer PM1. Since no photoelectric current flows between the inversion terminal "−" and the sliding terminal S1, circuits C1 & C2 as shown in the circuit of FIG. 7 are not necessary. In FIG. 9, too, the logarithmic expansion circuit, the switching circuit, etc., are omitted as in FIG. 8.

The operation of the circuit of FIG. 9 is as follows: A voltage proportional to the value $Bv$ of the objective luminance appears at the photodiode PD3. When the gate potential of the field-effect transistor FET1 is increased by this voltage, the base-emitter voltage of the transistor Q3 rises and also the gate potential of the field-effect transistor FET2 increases. Thus, the gate potentials of the field-effect transistors FET1 & FET2 become equal and the differential amplifier is balanced. As a result, a voltage proportional to the value $Bv$ of the objective luminance appears at the sliding terminal S1 of the potentiometer PM1 and the desired output signal appears at the output terminal Out 3 as shown in the aforementioned first and second detailed embodiments of FIGS. 7 & 8, respectively.

Figure 10:
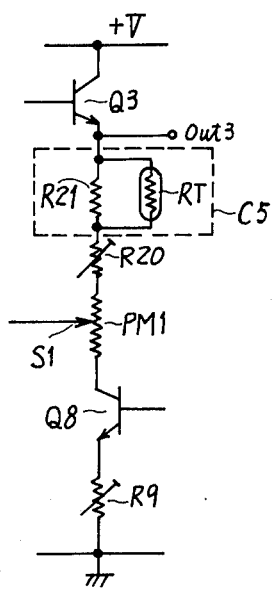

FIG. 10 is a fragmented diagram of the circuit shown in the foregoing embodiments of FIG. 7 to FIG. 9, to which are added, between the transistor Q3 and the potentiometer PM1, a variable resistor R20 for regulating output level, and a temperature-compensating circuit C5 comprising a parallel connection of resistor R21 and thermistor RT. By varying the resistance value of this resistor R20, the emitter voltage of the transistor Q3, hence the potential at the output terminal Out 3, can be varied. The temperature-compensating circuit C5 functions to compensate for undesirable variations of the resistance of potentiometer PM1 caused by temperature. Due to this function of compensating the temperature, a sufficiently precise exposure-control can be obtained over wide variation of temperature.

Figure 11:
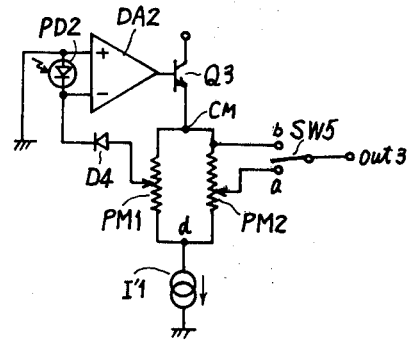
Figure 12:
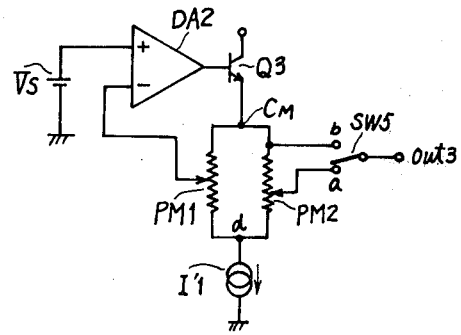

FIG. 11 and FIG. 12 show circuits of the computing apparatus with other connections, including the potentiometers PM1 & PM2 described for FIG. 5, FIG. 7 and FIG. 8. As is shown in the drawings, the ground side terminals of the potentiometers PM1 & PM2 are joined at a common junction $d$, and a constant current circuit I'1 is provided between this junction $d$ and ground. The potentiometers PM1 & PM2 are connected in parallel at the points $d$ & CM, and therefore, both voltages across both respective terminals are equal, and consequently, the number of computing steps that can be set for both potentiometers PM1 & PM2 become equal.

A switch SW5 is for changing over between a full-aperture measurement and a stop-down measurement. For measuring with the full aperture, this switch is connected to the side of a contact $a$, and for measuring with the stopped-down aperture, it is connected to the side of a contact $b$.

When constituted as above, there is the advantage of omitting one constant current circuit compared with the circuits of FIGS. 5, 7 & 8. The electric current value of each constant current circuit is adjusted to an appropriate value in the processing of the camera assembly, and therefore, such omission of adjustment work is also advantageous with respect to the production cost.

As is explained in detail in above, according to the present invention, the computing circuits for the control of exposure value can be modified for various purposes, for which diverse designing can be exploited. Unlike the circuits of the prior art used for similar purposes, this invention does not require such special elements as, for instance, variable resistors for exponentially varying the resistance value, but nevertheless, has the advantage of being capable of precisely controlling the exposure with a smaller number of circuit elements, and hence a smaller amount of power consumption.

While I have shown and described several embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

What is claimed is:

1. A light measuring apparatus for a camera having a circuit comprising:
    a means for supplying a reference level;
    a differential amplifier having a first input terminal, a second input terminal and an output terminal, said first input terminal being connected to said reference level;
    a photodiode connected between said first and second input terminals;
    a first potentiometer having a first terminal connected to said output terminal, a second terminal and a sliding terminal, said sliding terminal being slidable for setting exposure information;
    a diode connected between said sliding terminal and said second input terminal for forming a negative-feed-back path to set the voltage between said first and second input terminals equal to zero whereby the voltage from said reference level to said sliding terminal is equal to the voltage across said diode which is proportional to the logarithm of the current generated by said photodiode and flowing through said diode; and
    a first constant current feeding means for feeding said first potentiometer with a constant current to flow between said first and second terminals of said first potentiometer; the voltage from said sliding terminal to one of said first and second terminals of the first potentiometer being representative of the set exposure information making the voltage from said reference level to one of said first and second terminals of the first potentiometer equal to the voltage from said sliding terminal to said one of said first and second terminals of the first potentiometer added to the voltage from said reference level to said sliding terminal.

2. A light measuring apparatus as in claim 1 further comprising a transistor connected between the output terminal of the differential amplifier and first terminal of said first potentiometer; the base of said transistor being connected to the output terminal of said differential amplifier, the emitter of said transistor being connected to said first terminal of said first potentiometer; the collector of said transistor being connected to said reference level.

3. A light measuring apparatus as in claim 1, wherein said first constant current feeding means comprises a constant current circuit for feeding said first potentiometer with a constant current proportional to the absolute temperature.

4. A light measuring apparatus as in claim 1 further comprising a second potentiometer having a first terminal connected to said first terminal of said first potentiometer, a second terminal and a sliding terminal which is slidable for setting in additional exposure information, and a second constant current feeding means for feeding said second potentiometer with a constant current to flow between said first and second terminals of said second potentiometer; making the voltage from said reference level to said sliding terminal of said second potentiometer equal to the voltage from said first terminal of said second potentiometer to said sliding terminal of said second potentiometer added to the voltage from said reference level to said first terminal of said first potentiometer.

5. A light measuring apparatus as in claim 4 further comprising a switching means for selectively interrupting said second constant current feeding means from feeding said second potentiometer with said constant current.

6. A light measuring apparatus as in claim 1 further comprising a second potentiometer having a first terminal connected to said first terminal of said first potentiometer, a second terminal connected to said second terminal of said first potentiometer and a sliding terminal which is slidable for setting in additional exposure information,
    whereby a part of said constant current of said first constant current feeding means flows through said first potentiometer and the balance of said constant current of said first constant current feeding means flows through said second potentiometer between said first and second terminals thereof and the voltage from said reference level to said sliding terminal of said second potentiometer is equal to the voltage from said first terminal of said second potentiometer to said sliding terminal of said second potentiometer added to the voltage from said reference level to said first terminal of said first potentiometer.

7. A light measuring apparatus as in claim 6 further comprising a final output terminal and a switching means for alternatively connecting said final output terminal to either one of said first terminal and said sliding terminal of said second potentiometer.

8. A light measuring apparatus for a camera having a circuit comprising:
a means for supplying a reference level;
a first differential amplifier having a first input terminal, a second input terminal and an output terminal,
a voltage generating means for generating at its two terminals a voltage proportional to the logarithm of the intensity of the scene brightness, said two terminals of said voltage generating means being connected between said reference level and said first input terminal;
a first potentiometer having a first terminal connected to said output terminal, a second terminal and a sliding terminal slidable for setting exposure information;
a negative-feed-back path connected between said sliding terminal and said second input terminal to set the voltage between said first and second input terminals equal to zero whereby the voltage from said reference level to said sliding terminal is equal to said voltage generated by said generating means; and
a constant current feeding means for feeding said first potentiometer with a constant current to flow between said first and second terminals whereby the voltage from said sliding terminal to one of said first and second terminals of the potentiometer is representative of the set exposure information;
making the voltage from said reference level to one of said first and second terminals of the first potentiometer equal to the voltage from said sliding terminal to one of said first and second terminals added equal to the voltage from said reference level to said sliding terminal.

9. A light measuring apparatus as in claim 8 further comprising a transistor connected between the output terminal of the differential amplifier and first terminal of said first potentiometer; the base of said transistor being connected to the output terminal of said differential amplifier; the emitter of said transistor being connected to said first terminal of said first potentiometer; the collector of said transistor being connected to said reference level.

10. A light measuring apparatus as in claim 8 wherein said constant current feeding means comprises a constant current circuit for feeding said first potentiometer with a constant current proportional to the absolute temperature.

11. A light measuring apparatus as in claim 8 further comprising a second potentiometer having a first terminal connected to said first terminal of said first potentiometer, a second terminal connected to said second terminal of said first potentiometer and a sliding terminal which is slidable for setting another exposure information,
whereby a part of said constant current of said constant current feeding means flows through said first potentiometer and the balance of said constant current of said constant current feeding means flows through said second potentiometer between said first and second terminals thereof and the voltage from said reference level to said sliding terminals of said second potentiometer is equal to the voltage from said first terminal of said second potentiometer to said sliding terminal of said second potentiometer added to the voltage from said reference level to said first terminal of said first potentiometer.

12. A light measuring apparatus as in claim 11 further comprising a final output terminal and a switching means for alternatively connecting said final output terminal to either one of said first terminal and said sliding terminal of said second potentiometer.

13. A light measuring apparatus as in claim 8 wherein said voltage generating means comprises:
a second differential amplifier having a first input terminal connected to said reference level, a second input terminal and an output terminal which is connected to said first input terminal of said first differential amplifier;
a photodiode connected between said first and second input terminals of said second differential amplifier;
a diode connected between said output terminal of said second differential amplifier and said second input terminal of said second differential amplifier for forming a negative-feed-back path to set the voltage between said first and second input terminals of said second differential amplifier equal to zero whereby the voltage between said output terminal of said second differential amplifier and said reference level is equal to the voltage across the diode which is proportional to the logarithm of the current generated by said photodiode and flowing through said diode.

14. A light measuring apparatus for a camera having a circuit comprising:
a means for supplying a reference level;
a differential amplifier having a first input terminal connected to said reference level, a second input terminal and an output terminal;
a photodiode connected between said first and second input terminals;
variable resistance means having a first terminal, a second terminal, resistance between said first and second terminals and means for varying said resistance for setting exposure information, said first terminal being connected to an output terminal;
a diode connected between said second terminal and said second input terminal for forming a negative-feed-back path to set the voltage between said first and second input terminals equal to zero whereby the voltage from said reference level to said second terminal is equal to the voltage across the diode which is proportional to the logarithm of the current generated by said photodiode and flowing through said diode; and
a constant current feeding means for feeding said variable resistance means with a constant current to flow between said first and second terminals whereby the voltage from said second terminal to said first terminal is representative of the set exposure information, and the voltage from said reference level to said first terminal of said variable resistance means is equal to the voltage from said second terminal to said first terminal of said variable resistance means added to the voltage from said reference level to said second terminal of said variable resistance means.

* * * * *